(12) United States Patent
Miller (10) Patent No.: US 7,494,017 B2
(45) Date of Patent: Feb. 24, 2009

(54) FILTER ELEMENT WITH OFF-AXIS END CAP

(75) Inventor: Daniel W. Miller, Luckey, OH (US)

(73) Assignee: Parker-Hannifin Corporation, Cleveland, OH (US)

(*) Notice: Subject to any disclaimer, the term of this patent is extended or adjusted under 35 U.S.C. 154(b) by 180 days.

(21) Appl. No.: 11/016,626

(22) Filed: Dec. 17, 2004

(65) Prior Publication Data

US 2005/0252848 A1 Nov. 17, 2005

Related U.S. Application Data

(60) Provisional application No. 60/571,775, filed on May 17, 2004.

(51) Int. Cl.
*B01D 35/02* (2006.01)
*B01D 35/28* (2006.01)
*B01D 27/00* (2006.01)
*B01D 35/147* (2006.01)

(52) U.S. Cl. .................. 210/447; 210/450; 210/232; 210/456; 210/470; 210/451; 210/136; 210/130

(58) Field of Classification Search ............. 210/445, 210/450, 443, 232, 320
See application file for complete search history.

(56) References Cited

U.S. PATENT DOCUMENTS

| 908,309 | A | | 12/1908 | Mueller | |
|---|---|---|---|---|---|
| 2,712,871 | A | | 7/1955 | Schmid | |
| 2,915,188 | A | * | 12/1959 | Buker | .............. 210/447 |
| 3,502,220 | A | | 3/1970 | Kohlberg | |
| 3,970,557 | A | * | 7/1976 | Shoup | .............. 210/130 |
| 4,124,511 | A | * | 11/1978 | Lay | .............. 210/447 |
| 4,272,368 | A | * | 6/1981 | Foord et al. | .............. 210/90 |

(Continued)

FOREIGN PATENT DOCUMENTS

EP 1747053 B1 10/2007

(Continued)

OTHER PUBLICATIONS

Notification of Transmittal of The International Search Report and the Written Opinion of the International Searching Authority, or the Declaration from corresponding International Application No. PCT/US2005/013169.

(Continued)

*Primary Examiner*—Krishnan S Menon
*Assistant Examiner*—Benjamin Kurtz
(74) *Attorney, Agent, or Firm*—Christopher H. Hunter (57) ABSTRACT

A filter includes a filter element with an enlarged end cap at one end of a media ring with an elliptical flange set oblique or angled to the longitudinal axis of the element. The flange carries a sealing element, and is closely and sealingly received in a head casting of the filter to divide the head casting into inlet and outlet partitions. The end cap directs fluid from a transverse port in the housing into an axial flow path into the central cavity of the element, where the fluid flows radially outward through the media, and then out through an opposite transverse port in the head casting. The element can be removed when it is spent from the head casting after removal of an end closure.

32 Claims, 6 Drawing Sheets

U.S. PATENT DOCUMENTS

| | | | |
|---|---|---|---|
| 5,298,160 A * | 3/1994 | Ayers et al. | 210/232 |
| 6,217,755 B1 | 4/2001 | Stifelman et al. | |
| 6,416,563 B1 | 7/2002 | Wright et al. | |
| 2004/0035097 A1 | 2/2004 | Schlensker et al. | |
| 2004/0035509 A1 | 2/2004 | Schlensker et al. | |
| 2004/0164009 A1 * | 8/2004 | Smith | 210/132 |

FOREIGN PATENT DOCUMENTS

| | | |
|---|---|---|
| GB | 970 826 A | 9/1964 |
| WO | WO 02/38247 A1 | 5/2002 |

OTHER PUBLICATIONS

Notice of Opposition filed by the Donaldson Company, Inc., mailed Jul. 29, 2008, in corresponding counterpart European Application No. 05754491.8.

* cited by examiner

FILTER ELEMENT WITH OFF-AXIS END CAP

CROSS-REFERENCE TO RELATED CASES

The present application claims the benefit of the filing date of U.S. Provisional Application Ser. No. 60/571,775; filed May 17, 2004, the disclosure of which is expressly incorporated herein by reference.

BACKGROUND OF THE INVENTION

The present invention relates to fluid filters and more particularly to a hydraulic filter.

Hydraulic filters are commonly used as suction line filters, return line filters and pressure filters. One known filter is shown and described in U.S. Pat. No. 4,272,368, owned by the assignee of the present invention, in which a two piece housing is provided consisting of a head casting and an elongated, tubular filter container. A tubular filter element, having annular end caps sealingly bonded at each end of a ring-shaped media, is removeably located in the container. A diverter structure provides means for separating the head casting into inlet and outlet partitions in fluid communication respectively with the inner and outer portions of a tubular filter element. The diverter is in a truncated funnel-shaped configuration mounted at its larger periphery within a cylindrical cavity in the head casting. The diverter structure is removable through an open end of the head casting after removal of a cover member, and provides an efficient means for transmitting fluid flow between a transverse port of the housing and the axially-aligned filter element.

The smaller, necked-down end of the funnel-shaped diverter is removeably and sealingly received in one of the annular end caps of the element, and directs fluid flow into the interior of the filter element. The flow passes through the element where particulate and other contaminants are removed, and then passes out through an opposite transverse port in the head casting. The other annular end cap of the filter element is supported by a support member at the opposite, distal end of the container, which can be fixed to removable. The element can be removed when it is spent from the distal end of the container by separation from the diverter; or alternatively can be removed when the diverter is removed from the head casting, and then separated from the diverter.

While the filter described above has received acceptance in the market and provides a number of benefits for the user, it requires a separate diverter component, which adds cost to the system, complexity in manufacture and assembly, and also reduces the surface area of the media available for filtration. As such, it is believed there is a demand in the industry for a filter, particularly for hydraulic fluid, which has few components, is simpler to manufacture and assemble, and which includes increased surface area for filtration.

SUMMARY OF THE INVENTION

The present invention provides a novel and unique filter, particularly for hydraulic fluid, which has few components, is simple to manufacture and assemble, and includes increased surface area for filtration.

According to the present invention, the filter includes a filter element with an enlarged end cap at one end of the media ring with an elliptical flange set oblique or angled to the longitudinal axis of the element. The end cap carries a sealing element, also angled to the longitudinal axis, and is closely and sealingly received in the head casting of the filter to divide the head casting into inlet and outlet partitions. The end cap functions similar to a diverter, in that it directs fluid from a transverse inlet port in the housing into an axial flow path into the central cavity of the element, where the fluid can then flow radially outward through the media to separate particulate and other contaminants, and then flow out through the opposite transverse outlet port in the head casting.

A support member at the opposite distal end of the container supports the other annular end cap of the filter element. The element can be removed when it is spent from the open end of the head casting after removal of the cover member. A spring tab can be provided on the flange, which is engaged by the cover member to urge the element into fluid tight engagement with an internal ledge in the head. In addition, a handle can be provided in the first end cap of the element to facilitate removal from the head.

The filter element includes a larger extent of media than in prior designs, as the media can extend up into the head casting, thereby increasing the overall surface area available for filtration.

As such, the present invention provides a novel and unique filter, particularly for hydraulic fluid, which has few components, is simple to manufacture and assemble, and includes increased surface area for filtration.

Further features of the present invention will become apparent to those skilled in the art upon reviewing the following specification and attached drawings.

DETAILED DESCRIPTION OF THE PREFERRED EMBODIMENT

Figure 1:
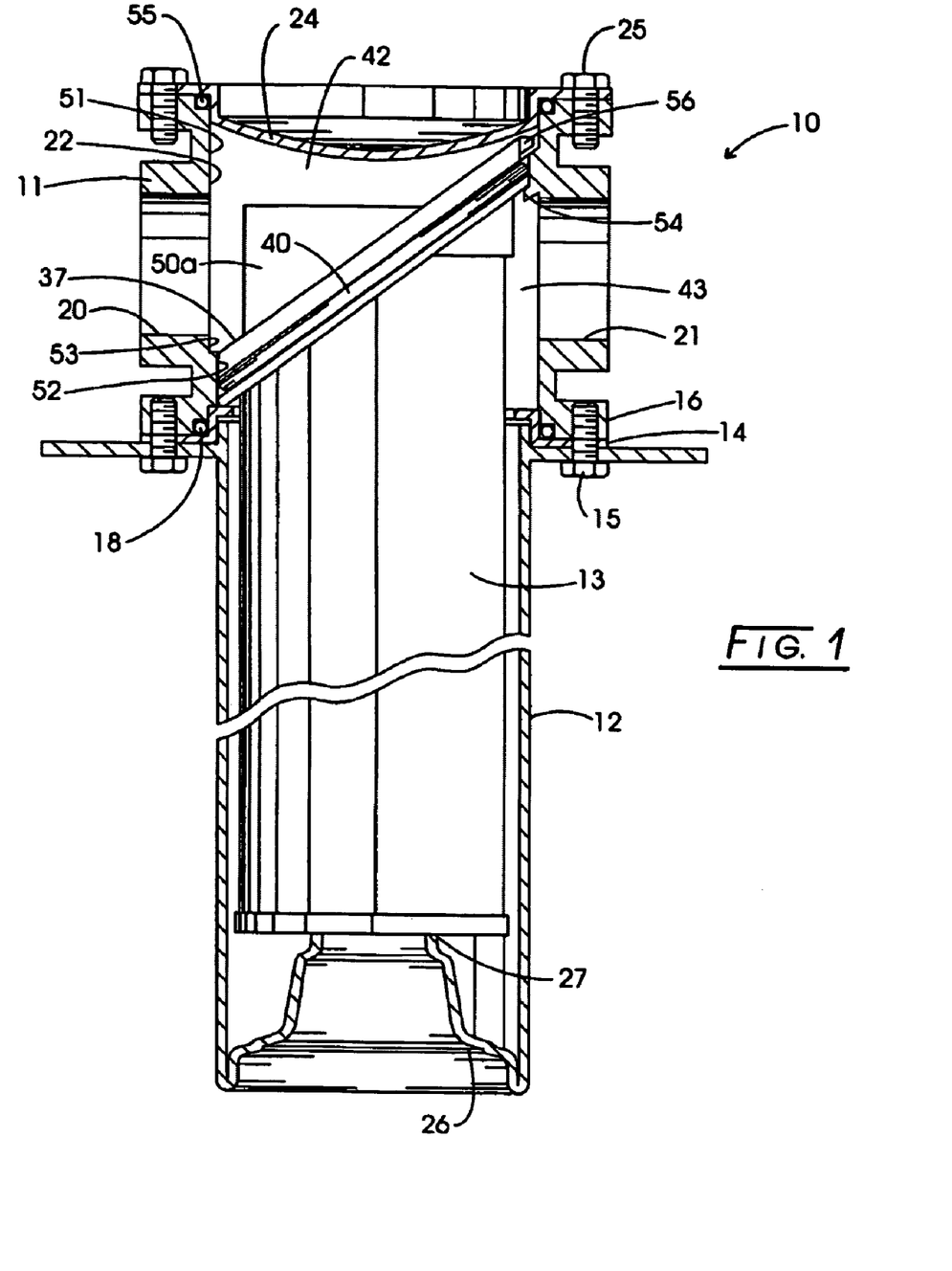
FIG. 1 is a side view in cross-section, of a filter constructed according to the principles of the present invention.
Figure 2:
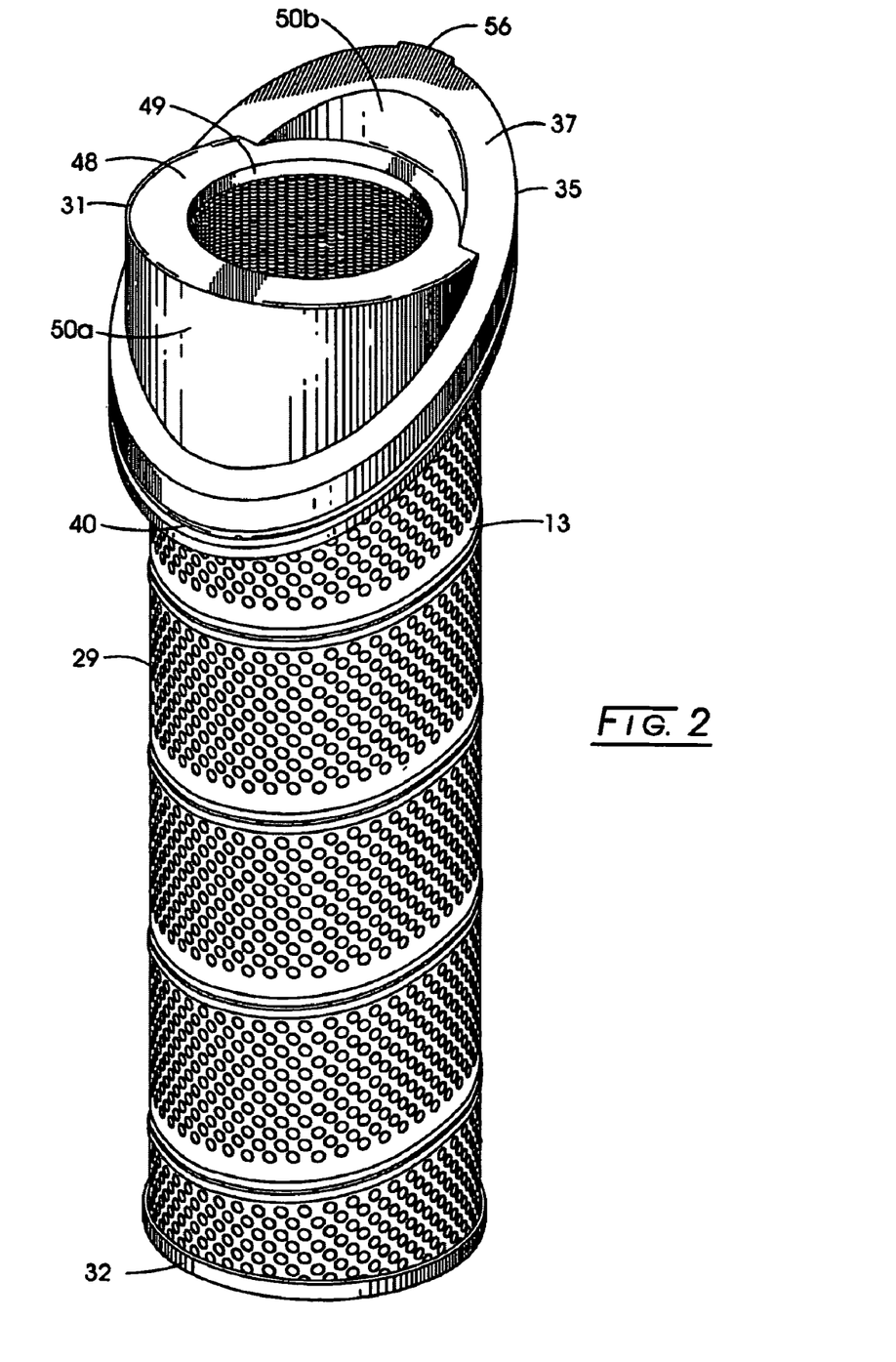
FIG. 2 is an elevated perspective view of the filter element for the filter of FIG. 1.

Referring to the drawings, and initially to FIG. 1, a filter constructed according to the present invention is indicated generally at 10. The filter includes a generally tubular head casting 11 and a tubular filter container 12 which together form an enclosure or housing for a filter element 13. The container 12 includes an annular flange piece 14 at one end welded to the container 12. The flange 14 has arcuate slots therein (not shown) for receipt of mounting bolts 15 engaging threaded holes in a flange portion 16 of the head casting 11 to provide a quick-release fastening arrangement. An O-ring seal 18 between the flanges 14, 16 provides a fluid seal.

The head casting 11 includes an inlet port 20 and outlet port 21, generally in alignment with one another and both disposed substantially transverse to the longitudinal axis of the tubular housing 12. The head casting 11 comprises a generally cylindrical inner surface 22 extending therethrough, being closed at one end by concave cover member 24 secured in place at its periphery by bolts 25 in a quick change slotted arrangement similar to that of the mounting flange of the filter housing 12 secured by bolts 15. The distal end of the filter housing 12 is fitted with a cup-shaped closure member 26, welded at its periphery to the end of the housing 12, the closure member 26 further including a central closed end tubular projection 27 which serves as a support member.

The head casting and container above are preferably substantially as shown and described in U.S. Pat. No. 4,272,368, which is incorporated herein by reference.

Referring now to FIGS. 2-5, the filter element 13 includes a ring of filtration media 29 circumscribing a central cavity 30, and bounded at its ends by a first, enlarged end cap 31, intended to be located in the head casting; and an opposite, somewhat radially-smaller end cap 32. The first end cap 31 has a radially-outwardly projecting mounting flange 35. Flange 35 is generally an oblique section of a cylinder conforming to the inner surface 22 of the head casting 11 and extends in a plane set oblique or angled (preferably at 45 degrees) to the longitudinal axis "A" of the element. The flange 35 is substantially an annulus in the form of an ellipse having the longer axis lying in the plane of the paper. The flange 35 includes an upper or outer elliptical flat surface or edge 37, and an oppositely facing lower or inner elliptical flat surface or edge 38, extending parallel to edge 38. The flange 35 carries an annular resilient sealing element 40, located in a peripheral groove or channel intermediate the upper and lower edges 37, 38, and preferably slightly closer to lower edge 38. Sealing element 40 is closely and sealingly received in the head casting 11 of the filter (see FIG. 1) to divide the head casting into fluidly-separated inlet and outlet partitions 42, 43.

The end cap 31 further includes a flat annular portion 48 defining a central opening 49, located in a plane normal to the longitudinal axis of the element and sealingly bonded to the end of the media ring in a known manner, such as with adhesive potting compound; and upper and lower cylindrical portion 50a and 50b, interconnecting the annular portion 48 and the flange 35, with cylindrical portion 50a closely surrounding the media. Flow through the inlet port 20 impacts one of the cylindrical portions 50a, 50b, which reduces the energy of the fluid, and slows its velocity, before the flow enters the central opening 49 in the filter element. The axial length of cylindrical portion 50a can vary depending upon the desired or acceptable pressure drop of fluid through the filter, and preferably the cylindrical portion 50a extends to about the midpoint of the inlet opening 20. The upper end cap 31, including flange 35 and cylindrical portion 50, is preferably formed in one piece (e.g., molded) as a unitary component from an appropriate material (e.g., plastic).

Figure 7:
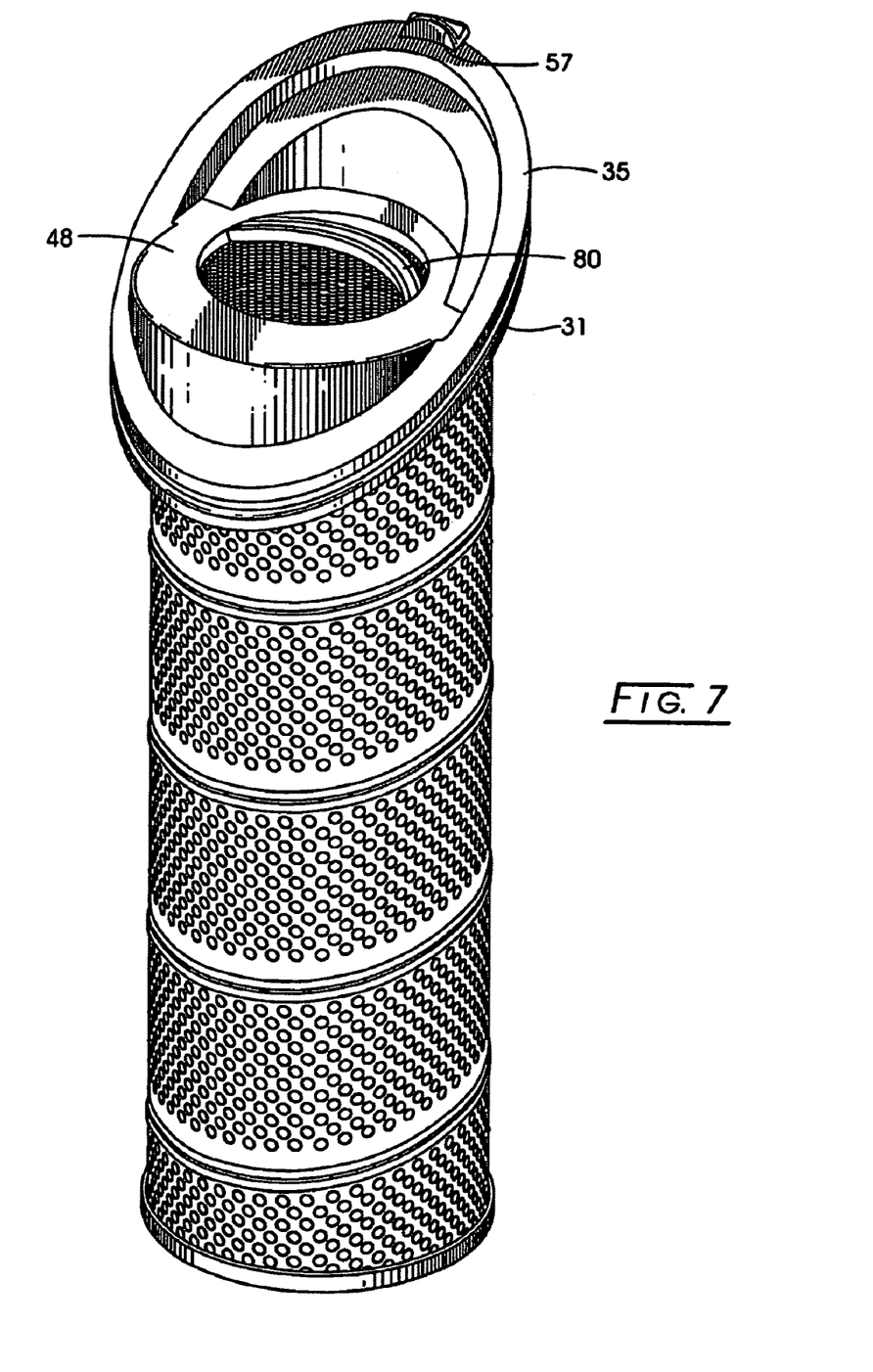
FIG. 7 is an elevated perspective view of the filter element according to a further aspect of the present invention.

The inner surface 22 of the head casting consists of a larger diameter portion 51 providing clearance for the end cap 31 and a reduced diameter seating portion 52 forming a seal seating portion, joined by a bevel 53. The head casting 11 is a die cast aluminum part and requires no further finishing for the internal surfaces thereof, including the seal seating portion 52 and the lead-in bevel 53. An internal annular ledge 54 encircles the entire inner surface of the head casting at an oblique angle, generally extending from just outside the outlet port 21 to toward a location inside the inlet port 20. The cover member 24 which is in sealed engagement with the head casting 11 by means of O-ring 55 may engage the outer portion of the flange 35 or be slightly spaced therefrom, as shown, to retain the element 13 in a seated position. A projection at 56 on flange 35 and a mating notch in inner surface 22, assure proper orientation between the element 13 and the head casting 11 so that the element is concentric with the longitudinal axis of the container 12. Alternatively or in addition to projection 56, a spring tab 57 can be provided on the flange 35, such as at the outermost portion of the flange, as shown in FIG. 7. Cover member 24 engages the distal end of spring tab 57 when installed on the head casting to urge the filter element axially inward against ledge 54, and thus facilitate providing a fluid-tight seal between the element and housing.

The filter element 13, thus may be readily removed from or inserted in the head casting 11 by non-rotative axial movement, with the bevel 53 providing an initial compression of the seal 40 upon insertion. Engagement of projection 56 in its mating notch (and/or compression of spring tab 57) and the geometry of the seating parts of the flange 35 and ledge 54 provide the proper orientation and axial location for the element.

As can be seen in FIG. 1, when the filter element 13 is located in the head casting 11, the upper flange surface 37 forms a shelf or shoulder, which can collect particulate matter from fluid impacting the cylindrical portion 50, and thus function as an initial separator device, before the fluid enters the central opening in the filter element.

The end cap 31 functions similar to the diverter referenced in the '368 patent, in that it directs fluid from the transverse inlet port 20 in the housing into an axial flow path into the central cavity 30 of the element 13, where the fluid can then flow radially outward through the media 29 to separate particulate and other contaminants, and then flow between the media and the container, and out through the opposite transverse outlet port 21 in the head casting.

The media 29 for the filter element is illustrated as being an open mesh or weave 58, formed into pleated layers extending in the longitudinal direction, and bounded on its outer surface by a perforated spiral or helical wrap 59. For many hydraulic applications, the components of the element would be formed by a metal such as stainless steel, however it should be appreciated that the filter element of the present invention could be formed in a variety of manners, and from a variety of materials. It could be a depth filter, surface filter, pleated, self-supporting ("coreless"), or in any number of known configurations and materials.

Figure 3:
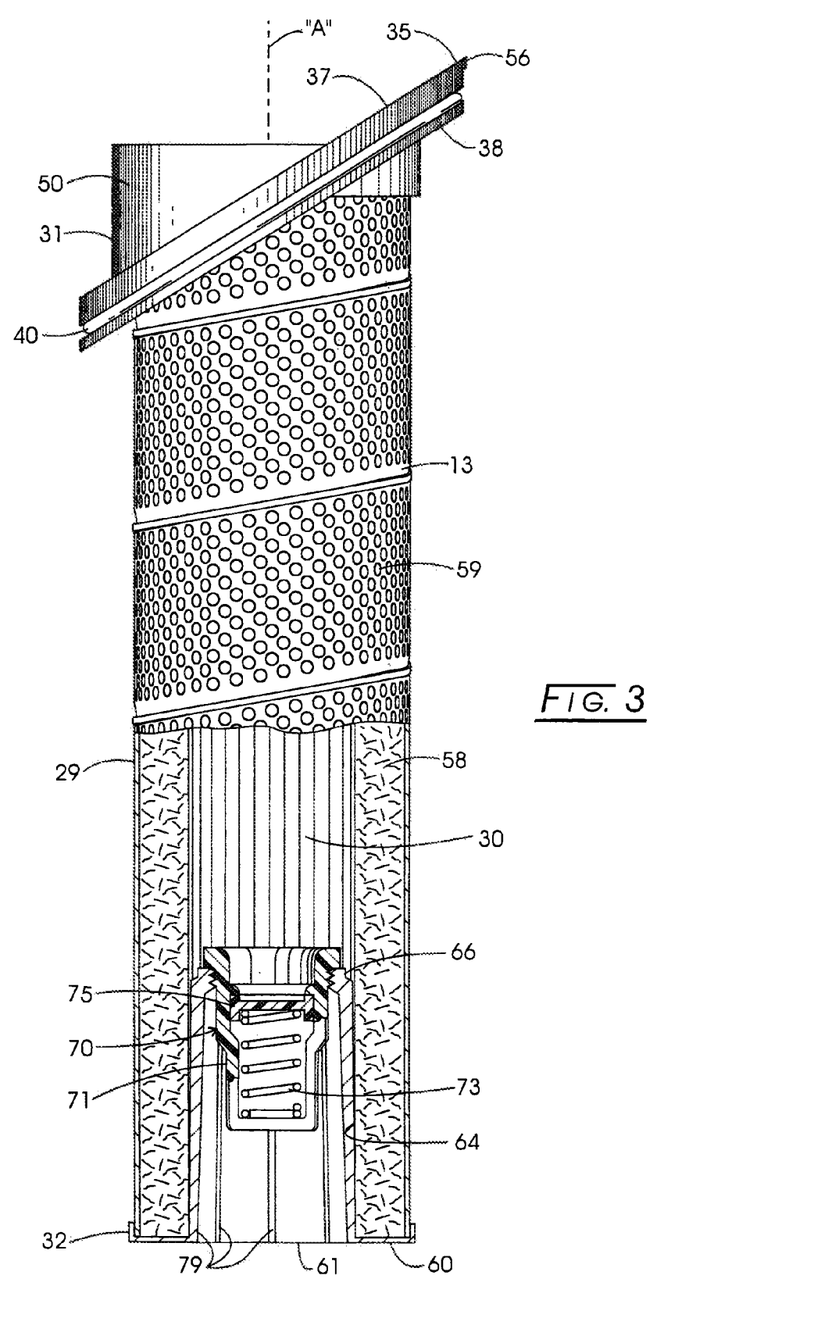
FIG. 3 is a side view of the filter element, with a portion in cross-section.
Figure 4:
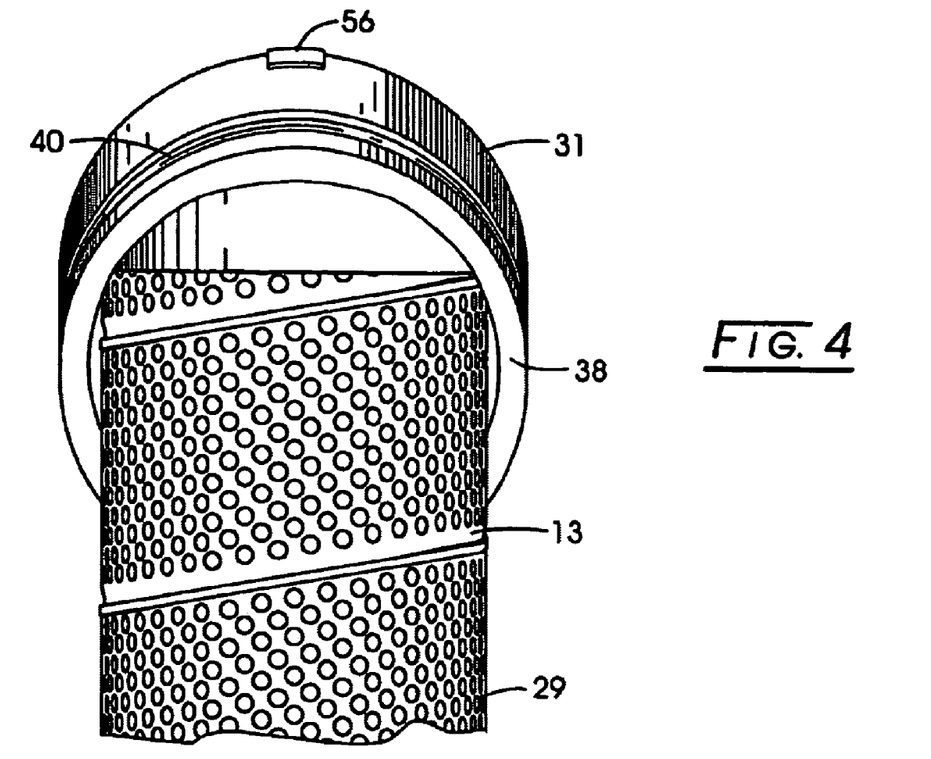
FIG. 4 is a rear view of the upper portion of the filter element.
Figure 5:
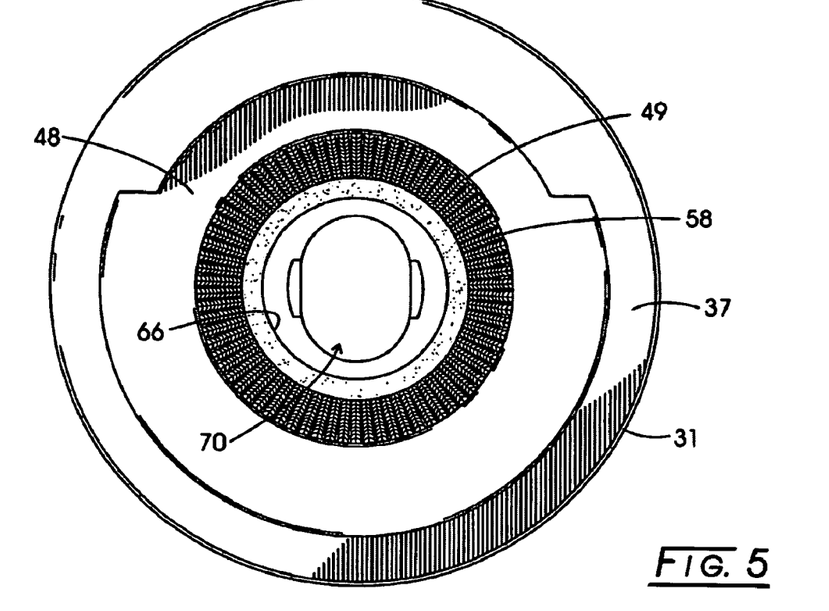
FIG. 5 is a top plan view of the filter element.
Figure 6:
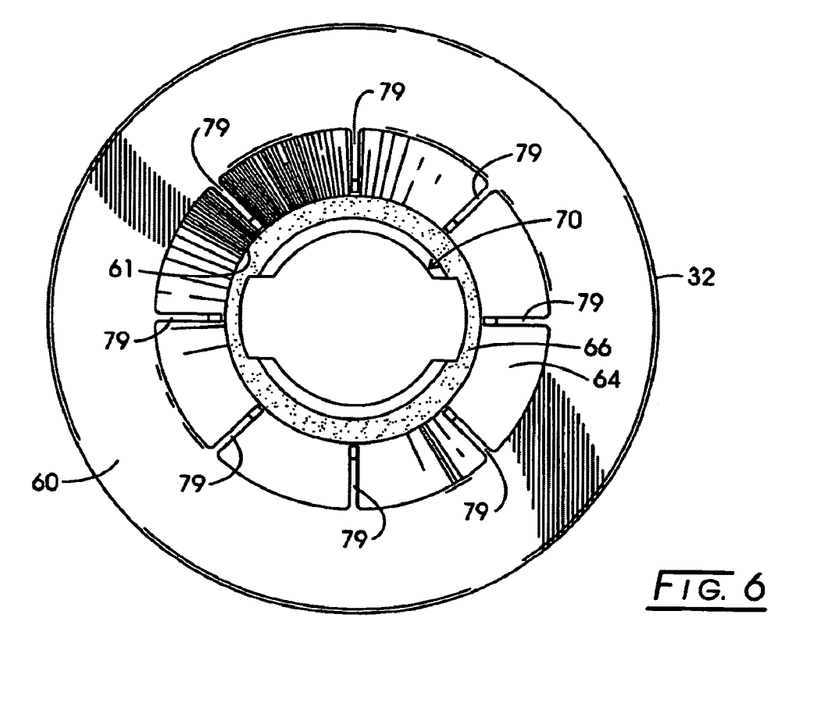
FIG. 6 is a bottom plan view of the filter element.

Referring now to FIGS. 3 and 6, the opposite end cap 32 of the filter element also includes a flat annular portion 60 defining a central opening 61, located normal to the longitudinal axis of the element and sealingly bonded to the opposite end of the media ring in a known manner, such as with adhesive potting compound. A conical portion 64 projects axially inward from annular portion 60 to an annular support flange 66, projecting radially inward from the inner distal end of the conical portion to define a central aperture, smaller in diameter than the opening 61, and concentric with the longitudinal axis of the element. Annular support flange 66 retains a bypass valve, indicated generally at 70, centrally within the element, which allows fluid to by pass a spent or clogged element to retain the functioning of the hydraulic system. By pass valve 70 is illustrated as including a cylindrical body 71 enclosing a spring 73 and a bypass valve member 75, biased into a closed position (illustrated) by spring 73 against a valve seat. Fluid pressure against valve member 75, such as when the element is clogged, tends to open valve member 75 against spring 73 and allow fluid to by pass the element.

Bypass valve 70 is retained within the filter element preferably by one or more threads, which are received in and engage the central aperture of the flange 66, or by other means, such as press-fit, or adhesive. Alternatively, bypass valve 70 could be located in cylindrical portion 50b of the upper end cap 35. In any case, bypass valve 70 is preferably substantially as shown and described in U.S. Pat. No. 4,815, 493, which is also incorporated herein by reference.

End cap 32 further includes a series of longitudinally extending and radially-inward projecting vanes as at 79, evenly spaced around the inner diameter of conical portion 64, and extending from opening 61 to annular support flange 66. The vanes provide support for the end cap, and particularly the annular support flange 66; and well as properly locate the element on the projection 27 of the closure member 26 and provide flow paths between the bypass valve and around the closure member 26 in the event of filter element bypass. The number and spacing of vanes can vary depending upon the particular application.

End cap 32, including annular portion 60, conical portion 64, vanes 79 is likewise formed in one piece as a unitary component from e.g., plastic, using conventional processes, e.g., molding.

It should be appreciated upon viewing FIG. 1 that the unique structure of the filter element of the present invention enables the media to extend upwards of the container portion of the filter—into the head casting. This provides additional surface area for filtration, and is dissimilar from the known filters, which, because of the use of bulky diverters which consume the available space in the casting head, contain the media substantially only within the container portion of the filter (see, e.g., U.S. Pat. No. 4,272,368).

Fluid flow is through inlet port 20, down into the central cavity of the element, radially outward through the media 29 where particles and other contaminants are removed, upward between the outer surface of the element and the container, and out through the outlet port 21. While the filter element is described above as being useful for filtering hydraulic fluid in a hydraulic fluid system, it should also be appreciated that the element could likewise be useful in other types of fluid systems, with appropriate choice of media.

When it is necessary to remove a spent filter element, the bolts 25 and cover member 24 (FIG. 1) are removed, and the element is removed through the open upper end of the head casting. To facilitate removal, a handle, such as shown at 80 in FIG. 7, can be provided. Handle 80 has a generally curved configuration formed unitary with, and extending from side-to-side of the annular portion 48 of the end cap 31, and is generally large enough to facilitate grasping, and yet small enough to reduce pressure drop and obstruction of flow. Other handle configurations are possible.

As described above, the present invention provides a novel and unique filter, particularly for hydraulic fluid, which has few components, is simple to manufacture and assemble, and includes increased surface area for filtration.

The principles, preferred embodiments and modes of operation of the present invention have been described in the foregoing specification. The invention which is intended to be protected herein should not, however, be construed as limited to the particular form described as it is to be regarded as illustrative rather than restrictive. Variations and changes may be made by those skilled in the art without departing from the scope and spirit of the invention as set forth in the appended claims.

What is claimed is:

1. A filter assembly including a housing enclosing a filter element, the housing including a head and a container, the head having transverse inlet and outlet ports, the filter element including a ring of media defining a central cavity and circumscribing a central longitudinal axis, a first end cap sealingly attached to a first end of the media ring, and a second end cap sealing attached to a second end of the media ring, the first end cap including an elliptical, radially-outward projecting flange permanently fixed to the first end cap, and extending in a plane at an oblique angle to the longitudinal axis of the filter element, at least a portion of the media ring extending entirely through the plane of the elliptical flange, the flange having an outer dimension larger than the outer dimension of the media ring, and outwardly surrounding a portion of the media ring, the first end cap further including a flat annular portion in a plane normal to the longitudinal axis and defining a central opening into the central cavity of the filter element, the annular portion intersecting the flange, and outer and inner imperforate cylindrical portions interconnecting the flange and the annular portion of the first end cap, the flange carrying a resilient sealing element, also at the oblique angle, and closely and sealingly received in the head of the filter housing to divide the head into inlet and outlet partitions, whereby the first end cap can direct fluid from the inlet port in the housing into an axial flow path into the central cavity of the filter element, where the fluid can flow radially outward through the media ring, and then out through the outlet port.

2. The filter assembly as in claim 1, wherein the head includes an inner cylindrical surface with a ledge encircling the surface at an oblique angle, the ledge facing outwardly from an open end of the head, the filter element being located against the ledge to axially locate the element within the housing.

3. The filter assembly as in claim 2, wherein the housing includes a closure member, removably attached to the head and enclosing the open end, and which can be removed to enable access to the element and removal of the element from the open end of the head.

4. The filter assembly as in claim 3, wherein the ledge remains with the head when the closure member is removed.

5. The filter assembly as in claim 4, further including spring tab on an outer portion of the flange, the closure member engaging the spring tab when attached to the head and urging the flange into sealing relation with the ledge.

6. The filter assembly as in claim 1, wherein the flange of the filter element includes a peripheral groove, and the resilient sealing element is located in the groove.

7. The filter assembly as in claim 1, wherein the flange of the filter element includes an outwardly-facing flat surface, and an opposite, inwardly-facing flat surface, parallel to the outwardly-facing flat surface.

8. The filter assembly as in claim 1, wherein the annular portion bisects the flange, and the outer cylindrical portion is a concave portion extending outwardly away from the annular portion and facing the inlet port; while the inner cylindrical portion is a convex portion surrounding a portion of the media ring and also facing the inlet port.

9. The filter assembly as in claim 8, wherein the inner cylindrical portion is located so as to block a portion of the flow entering the inlet port to reduce the energy of the flow.

10. The filter assembly as in claim 1, further including a handle connected to the annular portion and extending across the central opening from one side of the central opening to the other.

11. A filter element including a ring of media defining a central cavity and circumscribing a central longitudinal axis, a first end cap sealingly attached at a first end of the media ring, and a second end cap sealingly attached at a second end of the media ring, the first end cap including an elliptical, radially-outward projecting flange permanently fixed to the first end cap, and extending in a plane at an oblique angle to the longitudinal axis of the filter element, at least a portion of the media ring extending entirely through the plane of the elliptical flange, the first end cap including a flat annular portion in a plane normal to the longitudinal axis and defining a central opening into the central cavity of the filter element, the annular portion intersecting the elliptical flange, and outer and inner imperforate cylindrical portions interconnecting the elliptical flange and the annular portion of the first end cap, the flange carrying a resilient annular sealing element, also at the oblique angle, whereby the first end cap can direct fluid into an axial flow path into the central cavity of the filter element, where the fluid can flow radially outward through the media ring.

12. The filter element as in claim 11, wherein the flange has an outer dimension larger than the outer diameter of the media ring, and outwardly surrounds a portion of the media ring.

13. The filter element as in claim 11, wherein the flange of the filter element includes a peripheral groove, and the resilient sealing element is located in the groove.

14. The filter element as in claim 11, wherein the elliptical flange of the filter element includes an outwardly-facing flat surface, and an opposite, inwardly-facing flat surface, parallel to the outwardly-facing flat surface.

15. The filter element as in claim 11, wherein the annular portion bisects the elliptical flange, and the outer cylindrical portion is a concave portion extending outwardly away from the annular portion; while the inner cylindrical portion is a convex portion surrounding a portion of the media ring.

16. The filter element as in claim 11, further including a handle connected to the annular portion and extending across the central opening from one side of the central opening to the other.

17. The filter element as in claim 11, further including a spring tab on an outer portion of the flange.

18. A filter element including a ring of media defining a central cavity and circumscribing a central longitudinal axis, a first end cap sealingly attached to a first end of the media ring, the first end cap having a flat annular portion normal to the longitudinal axis, and a second end cap sealingly attached to a second end of the media ring, the first end cap including an elliptical flange permanently fixed to the first end cap and carrying a resilient sealing element, the flange extending in a plane at an oblique angle to the longitudinal axis of the element, the elliptical flange intersecting the annular portion of the first end cap, and wherein at least a portion of the media ring extends entirely through the plane of the elliptical flange, whereby the first end cap can direct fluid into an axial flow path into the central cavity of the filter element, where the fluid can flow radially outward through the media ring.

19. The filter element as in claim 18, wherein the flange has an outer dimension larger than the outer diameter of the media ring, and outwardly surrounds a portion of the media ring.

20. The filter element as in claim 18, wherein the flange of the filter element includes a peripheral groove, and the resilient sealing element is located in the groove.

21. The filter element as in claim 18, wherein the flange of the filter element includes an outwardly-facing flat surface, and an opposite, inwardly-facing flat surface, parallel to the outwardly-facing flat surface.

22. The filter element as in claim 18, wherein the annular portion bisects the flange, and inner and outer imperforate cylindrical portions interconnecting the annular portion and the elliptical flange, the outer cylindrical portion extending outwardly away from the annular portion and having a concave configuration; and the lower cylindrical portion surrounding a portion of the media ring and having a convex configuration.

23. The filter element as in claim 18, wherein the annular portion defines a central opening into the central cavity of the filter element, and further including a handle connected to the annular portion and extending across the central opening from one side of the central opening to the other.

24. The filter element as in claim 18, further including a spring tab on an outer portion of the flange.

25. A filter element including a ring of media defining a central cavity and circumscribing a central longitudinal axis, a first end cap sealingly attached at a first end of the media ring, with a flat annular portion normal to the longitudinal axis, and a second end cap sealingly attached at a second end of the media ring, the first end cap including an elliptical flange extending in a plane at an oblique angle to the longitudinal axis of the element, and intersecting the annular portion of the first end cap, and a resilient sealing element around the periphery of and circumscribing the flange, wherein at least a portion of the media ring extends entirely through the plane bounded by the elliptical flange, whereby the first end cap can direct fluid into an axial flow path into the central cavity of the filter element, where the fluid can flow radially outward through the media ring.

26. The filter element as in claim 11, wherein the first end cap includes a flat annular portion permanently fixed to an end of the media ring.

27. The filter element as in claim 26, wherein the flange is unitary with the flat annular portion.

28. The filter element as in claim 18, wherein the first end cap includes a flat annular portion permanently fixed to an end of the media ring, and the flange is unitary with the flat annular portion.

29. A filter element including a ring of media defining a central cavity and circumscribing a central longitudinal axis, a first end cap fixed to one end of the media ring, and a second end cap fixed to at an opposite end of the media ring, the first end cap including an elliptical, radially-outward projecting flange permanently fixed to the first end cap, and extending in a plane at an oblique angle to the longitudinal axis of the filter element, the flange carrying a resilient sealing element around its periphery, also at the oblique angle, wherein the first end cap further includes i) a flat annular portion in a plane normal to the longitudinal axis and defining a central opening into the central cavity of the filter element, the annular portion intersecting the elliptical flange, and ii) a first imperforate cylindrical portion, with a radially-outward facing convex surface portion, interconnecting the elliptical flange and the annular portion of the first end cap, wherein at least a portion of the media ring extends entirely through the plane of the elliptical flange, whereby the first end cap can direct fluid into an axial flow path into the central cavity of the filter element, where the fluid can flow radially outward through the media ring.

30. The filter element as in claim 29, further including a second imperforate cylindrical surface portion with a radially-inward facing concave surface portion, between the annular flange and the elliptical portion of the first end cap.

31. The filter element as in claim 25, wherein the flange is unitary with the flat annular portion.

32. The filter element as in claim 29, wherein the first end cap includes a flat annular portion permanently fixed to an end of the media ring, and the flange is unitary with the flat annular portion.

* * * * *